United States Patent [19]

Ray

[11] Patent Number: 4,523,621
[45] Date of Patent: Jun. 18, 1985

[54] METHOD FOR MAKING METALLIC GLASS POWDER

[75] Inventor: Ranjan Ray, Randolph, N.J.

[73] Assignee: Allied Corporation, Morris Township, Morris County, N.J.

[21] Appl. No.: 476,004

[22] Filed: Mar. 17, 1983

Related U.S. Application Data

[60] Division of Ser. No. 349,807, Feb. 18, 1982, Pat. No. 4,386,896, which is a continuation of Ser. No. 23,413, Mar. 23, 1979, abandoned.

[51] Int. Cl.$^3$ ............................................. B22D 23/00
[52] U.S. Cl. ..................................... 164/46; 164/475; 264/8; 264/12
[58] Field of Search ............................ 264/12, 13, 7, 8; 425/7, 8; 164/46, 423, 429, 463, 475; 239/504

[56] References Cited

U.S. PATENT DOCUMENTS

| | | | |
|---|---|---|---|
| 3,147,142 | 9/1964 | Rudo | 239/504 |
| 3,838,185 | 9/1974 | Maringer et al. | 164/423 |
| 3,887,667 | 6/1975 | Clark | 264/10 |
| 3,908,745 | 9/1975 | Caldwell et al. | 164/463 |
| 4,027,718 | 6/1977 | Lundgren | 164/46 |
| 4,149,884 | 4/1979 | Maringer et al. | 164/463 |
| 4,221,587 | 9/1980 | Ray | 264/8 |

FOREIGN PATENT DOCUMENTS 53-16391  5/1978  Japan ................................. 164/46

Primary Examiner—Nicholas P. Godici
Assistant Examiner—Richard K. Seidel
Attorney, Agent, or Firm—Ernest D. Buff; Gerhard H. Fuchs

[57] ABSTRACT

A method for making metallic glass powder is disclosed, which involves atomizing a jet of molten glass forming metal alloy by impinging with a moving body to form a stream of discrete molten droplets of the metal alloy, followed by impinging that stream on a travelling chill surface to effect rapid solidification of the molten droplets. The powder can be fabricated into solid articles.

12 Claims, 9 Drawing Figures

METHOD FOR MAKING METALLIC GLASS POWDER

This application is a divisional of Ser. No. 349,807, filed Feb. 18, 1982, now U.S. Pat. No. 4,386,896, which is a continuation of Ser. No. 023,413, filed Mar. 23, 1979, now abandoned.

FIELD OF THE INVENTION

This invention relates to amorphous metal powders and in particular powders made with compositions of known glass forming alloys.

DESCRIPTION OF THE PRIOR ART

Economic methods of fabricating various metallic glasses in the form of filaments, wire, ribbon or strip in large quantities necessary for practical applications are well established as the existing state of the art. Metallic glasses exhibit extraordinary magnetic, mechanical and chemical properties and are thus of great interest as engineering materials. In the form of wire, ribbon or strip, metallic glasses might have potential applications as tire cord, reinforcing elements in composite materials, soft magnetic cores in motors and transformers, cutlery, tape recording head and many other engineering applications.

Numerous conventional metals and alloys such as iron and steels of various grades, nickel, copper and aluminum are commercially produced as powders. In the majority of the cases these powders are subsequently consolidated by powder metallurgical methods into various commercial products having useful properties. Over the past two decades, innovative metallurgical techniques led to fabrication of powder metallurgical parts with properties superior to wrought and cast products of many alloys, thereby causing vastly increased technological demand for metal powders.

Methods for obtaining metal in powder form are known. For example, relatively fine metal powder can be made by several processes involving atomization of molten metal. A method of making steel powder having, after compaction, a high density and superior physical properties has, for example, been disclosed by Robert A. Huseby in U.S. Pat. No. 3,325,277, issued June 13, 1967. The Huseby method involves impinging a jet of molten steel against a flat, sheet-like stream of water flowing at high velocity to atomize the molten steel to obtain agglomerates of solid particles of high density.

U.S. Pat. No. 3,598,567 to Grant disclosed atomization from a liquid metal bath, the atomized particles or droplets being rapidly solidified, and then advantageously rapidly quenched to low temperatures to avoid coarse particle precipitation and/or growth. As the liquid particles are produced, they are delivered to a quenching medium, such as refrigerated air, nitrogen, or argon and more advantageously, wet steam, water brine or even a cold metal substrate of high heat conductivity metal, such as copper, silver, steel and the like. The rate of cooling to achieve a fine dendrite spacing of the phases should be at least about 100° C./sec. and where cooling on a metal substrate is employed, may range up to about $10^{6°}$ or $10^{8°}$ C./sec. With regard to the latter, the high rate of cooling is achieved by projecting the finely divided liquid droplets of metal at high velocity against the metal substrate. The metal powder produced in this manner has a finely refined structure, is substantially free from segregation and is capable of being hot worked into a hard metal shape by hot consolidating the powder mass, for instance, by hot extrusion.

U.S. Pat. No. 3,646,177 to Thompson discloses a method for producing powdered metals and alloys that are free from oxidation by a process which involves atomizing molten metal with a fluid jet to form discrete particles of the molten metal and directing the stream into a reservoir of an inert cryogenic liquid to solidify the particles under protection from oxidation during cooling.

U.S. Pat. No. 3,764,295 to Lindskog discloses a method for making steel powder wherein a jet of atomizing fluid is directed against a stream of molten steel to atomize the molten steel into particles consisting of a metallic core and an oxide skin, and thereafter the particles are allowed to solidify.

U.S. Pat. No. 3,813,196 to Backstrom discloses a device for atomizing molten metals wherein a first jet of an atomizing fluid is directed against a jet of molten metal to form a combined stream of the molten metal and the first jet of atomizing fluid. Then a second jet of atomizing fluid impinges the combined stream at a certain angular relationship to the molten metal stream and as a result of the specific arrangement of the jet embodied in particular nozzles and their orientation a fine, very uniform powder is obtained which consists of smooth, substantially spherical particles.

Amorphous metal alloys and articles made therefrom are disclosed by Chen and Polk in U.S. Pat. No. 3,856,513. This patent discloses metal alloy compositions which are obtained in the amorphous state and are superior to such previously known alloys based on the same metals. These compositions are easily quenched to the amorphous state and possess desirable physical properties. This patent discloses that powders of such amorphous metals with particle size ranging from about 0.004 to 0.010 inch can be made by atomizing the molten alloy to droplets of this size, and then quenching these droplets in a liquid such as water, refrigerated brine or liquid nitrogen.

Metallic glasses in the form of powders have useful applications. Powders of metallic glasses have most of the unique properties of the same alloys in the glassy bulk form, e.g. ribbon, filament or wire. Soft magnetic metallic glasses in the form of powders can be cold pressed into magnetic cores. Also, metallic glass powders can be powder metallurgically hot consolidated or thermomechanically pressed into discrete structural processed shapes and parts having useful mechanical properties. Complex composite materials composed of both metallic glass phases and crystalline metallic or nonmetallic phases can be designed and fabricated by powder metallurgical techniques to provide the exceptional properties required in the highly sophisticated and demanding aerospace, electronic and nuclear industries.

U.S. Pat. No. 2,825,108 to Pond discloses a method for making metallic filaments directly from the melt by directing a jet of molten metal against the inner surface of a rapidly rotating cup shaped chill body. Progressive reduction of the ejection velocity of metal melt results in shorter and shorter filaments until the length to width ratio of the filament approaches unity and the filament becomes a particle of flake powder.

A method for making metal flakes suitable for making metal powder for powder metallurgical purposes is disclosed by Lundgren in German Offenlegungsschrift No. 2,555,131 published Aug. 12, 1976. The process involves impinging a jet of molten metal against a rotating flat disc. Relatively this, brittle and easily shattered essentially dentrite free metal flakes are obtained with between amorphous and microcrystalline structure, from which a metal powder can be obtained by shattering and grinding, for instance in a ball mill.

There remains a need for methods for making amorphous (glassy) metal powder having good properties for use in metallurgical processes.

SUMMARY OF THE INVENTION

The present invention provides a method for making metallic glass powder. A jet of molten glass-forming metal alloy is formed and then momentum is transferred from a moving body onto said jet to atomize said jet into a stream of discrete molten metal droplets. The flow of the atomized molten metal droplets is directed against a travelling chill surface to impinge the atomized molten metal droplets against the travelling chill surface to effect rapid solidification thereon.

The quench rate of the atomized metal on the chill surface is within the range between about $10^{4°}$ C. per second and $10^{6°}$ C. per second, or higher. The particle size of the metallic glass powder as produced is typically less than about 100 microns.

In accordance with one specific embodiment of the invention process a jet of molten glass forming metal alloy is formed and impinged on a stream of an inert fluid to atomize the molten metal and to direct the flow of the atomized molten metal against a travelling chill surface to thereby impinge the atomized molten metal against the chill surface and to effect rapid solidification of the molten metal thereon. The stream of inert fluid may be provided in the form of a flat sheet by forcing fluid through a correspondingly shaped orifice under a pressure which may be greater than about 1000 pounds per square inch. The stream of inert fluid and the jet of metal intersect at an angle greater than 10°.

In another embodiment a jet of molten glass forming metal alloy is deflected and atomized by a moving solid body.

Apparatus of the present invention for making metallic glass powder comprises a holding vessel for holding molten glass forming metal, nozzle means which is in communication with said holding vessel for generating a jet of the molten metal, a means for expelling the molten metal through said nozzle means to generate a jet of the molten metal, means for atomizing such jet of the molten metal expelled through the nozzle to atomize said jet into a stream of discrete droplets of molten metal, and a travelling chill surface located in the path of said stream of discrete particles of molten metal for impingement of said droplets thereon for solidification into a glassy metal powder. The apparatus may further comprise means for removing the glassy metal powder droplets from the chill surface and gating means for minimizing contact between atomized molten metal droplets and already solidified droplets on the chill surface. Providing a travelling chill surface to the atomized particles results in a continuous fresh surface exposed to the atomized particles for rapid quenching.

DETAILED DESCRIPTION OF THE INVENTION

Figure 1:
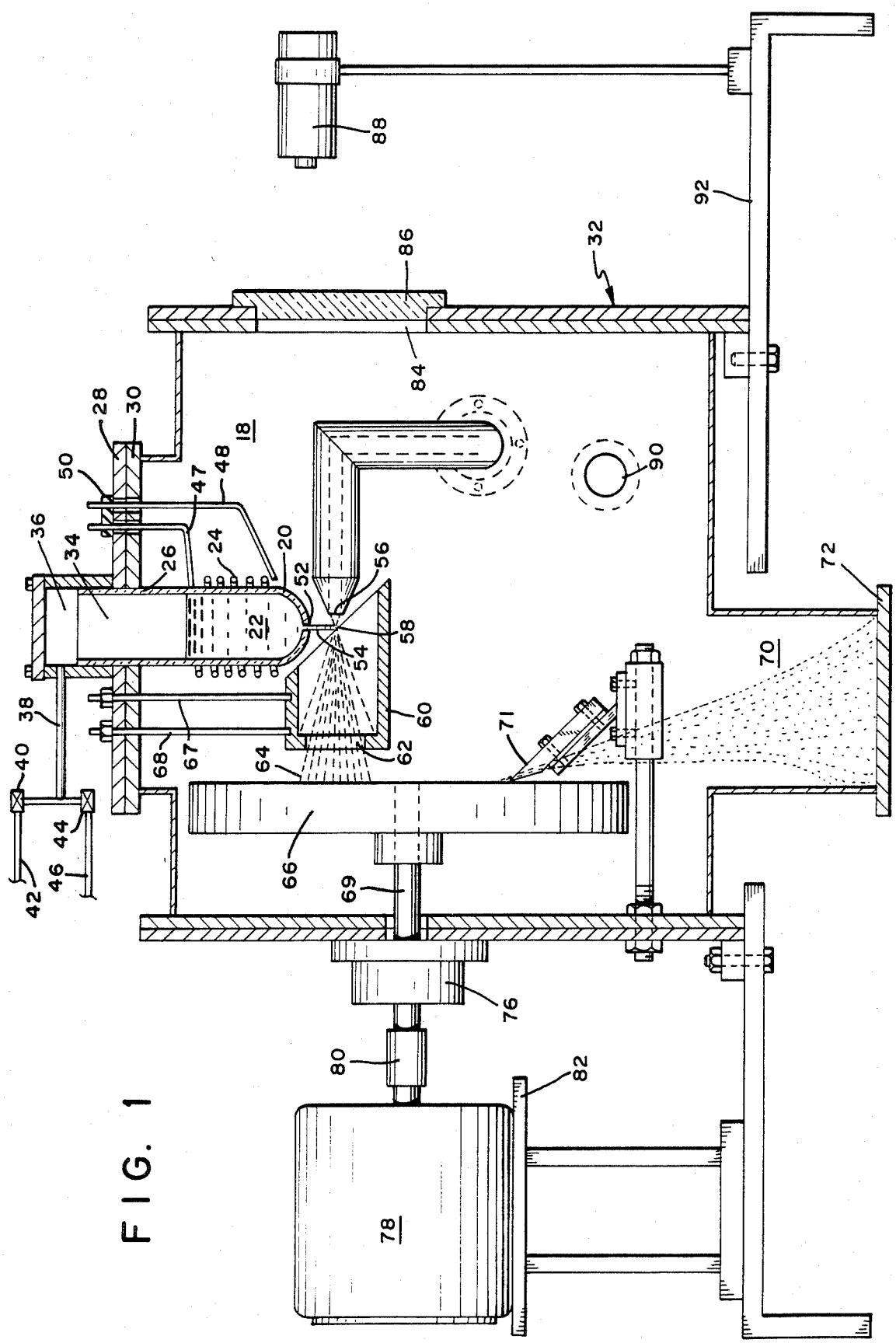
FIG. 1 is a sectional elevation view of an apparatus for producing glassy metallic powders.

The present invention relates to production of metallic glass powder involving atomization of a jet of molten glass forming metal alloy, under certain specific conditions, followed by rapid cooling of the atomized molten metal by quenching on a moving chill surface. The glass forming metal alloy is melted in a suitably heated crucible. Many types of techniqes for melting alloys are well known in the art. The glass forming alloys can be melted in a vacuum or inert atmosphere in accordance with usual metal melting practices. Induction melting or electric arc melting furnaces may be used. Desirably, the crucibles or the linings of the inside walls of the furnace containing the melts should be made of inert materials such as fused quartz, high purity alumina, zirconia, magnesia, beryllia and yttria and the like. The temperature of the melt is measured and controlled according to known standard practives. The melt is heated to a temperature sufficiently above the freezing point of the alloy in order to allow atomization of the molten alloy without immediate freezing during the atomization process. In general, temperatures of about 100° C. to about 400° C. above the liquidus temperature are suitable. The preferred temperature ranges from about 150° C. and to 250° C. above the liquidus temperature. Furthermore, it is advantageous for the atomization process when the viscosity of the liquid alloy is low and, in general, the viscosity decreases with increasing temperature.

The molten alloy is expelled through a suitable nozzle to form a jet of molten metal.

The metal can be expelled through the nozzle orifice by application of pressure, such as hydrostatic, hydraulic or gas pressure. Gas pressure, possibly in combination with hydrostatic pressure, is preferred. The pressure acting on the liquid metal near the nozzle is not critical so long as it results in formation of a coherent jet having velocities within the critical range below described. Exemplary suitable pressures range from about 15 psi to 30 psi. Preferably, the pressure is from about 20 psi to 25 psi.

Nozzles suitable for jetting the molten alloy include, for example, those described in U.S. Pat. No. 2,968,062 and U.S. Pat. No. 3,253,783, both to Probst et al. The shape of the nozzle orifice is not critical. For convenience of fabrication, round orifices are preferred. Such orifices may, suitably, have diameters from about 0.5 mm to 5 mm. Preferably, the diameter of the nozzle orifice is from about 0.1 mm to 1 mm. The nozzle may be made of the same type of material as the crucible, as above discussed. The material should be sufficiently hard to minimize erosion of the orifice during passage of molten metal through it. The nozzle is coupled to the crucible by suitable means. For example, it may be fitted into a machined groove in the bottom part of the crucible and bonded by a ceramic cement. The length of the nozzle orifice is not critical, preferably it is from about 2 mm to 30 mm.

Desirably, the jet of molten alloy expelled through the nozzle has a small diameter. For example, the diameter of the jey may be from about 0.5 mm to 5 mm. The velocity of the jet may be from about 2 m/sec to 10 m/sec and preferably is from about 4 m/sec to 7 m/sec.

The velocity of the molten alloy jet is critical. When the jet speed is too low, the jet tends to become discontinuous. When the jet has too high a speed, it becomes very difficult to break up the jet because of the large momentum it is carrying. The jet can be atomized by transfer of momentum from a solid or fluid material. The transfer of momentum effects a disturbance and acceleration of the jet, causing its breaking up into small droplets.

The jet of molten metal alloy expelled through the nozzle orifice may be atomized by subjecting it to the action of a high pressure fluid jet. An inert fluid for the purposes of the present invention is a fluid which does not, or for practical purposes does not, react with the molten alloy. Fluids suitable for the purpose include inert gases such as argon, nitrogen, hydrogen and helium; liquids such as water, liquid metals such as thallium, tin, lead, liquid salts such as alkali halides, and the like. Preferred atomizing fluids are argon and nitrogen. The process is desirably carried out under a protective atmosphere, such as argon and nitrogen inside an atomization chamber made of suitable material, such as mild or stainless steel, in order to prevent oxidation. For this purpose and for convenience the furnace-crucible assembly is then located inside the atomization chamber. The chamber is provided with ports for the introduction of fluids. The whole chamber may, for example, be evacuated to $2 \times 10^{-5}$ torr during the melting procedure of the alloy. The nozzle orifice is kept closed by a suitable refractory stopper rod. Prior to jetting, the atomization chamber is back filled wih the gas providing the protective atmosphere, and it may then be continuously purged at a pressure above one atmosphere, e.g., by 5 psi. The crucible is next pressurized as by filling it with argon to from about 20 to 30 psi, and the stopper rod is removed from the nozzle to expel the molten metal in jet form.

Several configurations of fluid jets can be employed to effect atomization of molten metal jets into fine droplets. The fluid jet need not be divergent or in sheet form. For example, the jet of molten metal may be intersected by a single diverging flat fluid stream. In that configuration the normal to the plane of the flat fluid stream and the velocity vector of the molten metal jet desirably lies in a vertical plane which is perpendicular to the plane of the travelling chill surface, upon which the atomized stream of molten metal is to be impinged. The molten metal jet desirably intersects the flat fluid stream at an angle betwen 5° and 90°; and preferably between 20° and 50°.

In another suitable configuration two diverging flat streams of an inert fluid intersects to form a V-jet with apex angle between 10° to 90° and preferably between 20° and 50°. The vertical molten metal jet is intersected by the V-jet at the apex. Four or more flat stream jets emerging from nozzles which are equally spaced apart on a circle can intersect to create a down cone with a well defined apex. If the number of jets is increased, eventually an annular jet is obtained.

In all the above configurations, intersection of the molten metal jet by the fluid jets result in the formation of a spray of molten droplets in the form of a cone.

The fluid stream can be of any suitable shape, such as a diverging flat sheet, a V-jet or a cone. Preferred shapes of the fluid stream are V-jet and cone.

The atomized molten metal droplets are propelled toward the travelling chill surface and the axis of the conical spray of molten metal droplets is desirably maintained perpendicular to the surface plane of the chill surface substrate. A perpendicular spray provides for a more concisely defined impact area on the chill surface.

The temperature of the atomizing fluid is not critical and may conveniently be from about 25° C. to 200° C. The angle between the velocity vectors of molten metal jet and fluid can lie between about 5° and 90°. Preferably, the angle between the vectors is from about 30° to 50°. This can be achieved by inert gas under high pressure, for instance 100 to 1500 psi which impinges upon the molten alloy stream and disperses the same into droplets with their size ranging from very fine to relatively coarse. Preferred gas pressures are in the range of about 100-400 psi, more preferably about 150-300 psi.

In addition to fluids, it is also possible to disintegrate the jet into droplets by mechanical impact provided by a rapidly moving or rotating surface with sufficient momentum, desirably one made of materials which are not wetted or abraded by the molten alloys. Solid bodies providing such surface for impingement and atomization can be shaped as flat, circular or elliptical discs, with or without teeth or varries. Exemplary solid bodies are found in the drawing. It is necessary that the solid body provides a surface which can impact and transfer momentum to the molten metal jet. The angle between molten jet and surface normal of the solid body can be from about 5° to 60°. The angle between molten jet and peripheral velocity can be from about 95° to 150°. The solid body can be, for example, made of materials such as fused quartz, alumina, zirconia, silicon carbide and boron nitride. Preferred materials of the solid body are alumina and fused quartz. The materials chosen should be reasonably inert and should not react with the molten alloy.

The atomized droplets are directed toward and into contact with the chill surface provided by a moving chill body whereby they are quenched on impact and deposited as flakes or powder. The moving chill body preferably is made of a metal of high thermal conductivity such as copper, silver and the like. Due to rapid quenching upon impact, the droplets solidify as glassy powders or flake. A preferred embodiment of the moving chill body comprises a rotatably mounted copper wheel which rotates around its axis and continuously provides a new chill surface to the impinging molten metal droplets. Preferably a scraper is used to remove the solidified particles adhering to the moving chill surface. To that end, the scraper may be located at that side of the rotating wheel opposite from that at which the droplets impinge upon the rotating wheel.

Depending upon the physical spread of the stream of atomized droplets, it may occur that liquid droplets impinge upon droplets which are already frozen and adhering to the moving chill surface. This can be substantially minimized by providing an optional gate which limits the geometrical area of the chill surface accessible to the stream of droplets. The purpose of such a gate is to promote deposition of molten droplets on the chill surface separately and isolated from each other. Another purpose of the gate is avoiding the spreading of droplets and particles all over the apparatus and to aid in collecting misdirected particles. This is desirable because in case a second droplet is deposited onto an already deposited droplet, then the second droplet may not be quenched to the glassy state. Therefore it is desirable that the velocity movement of the chill surface and the velocity of the molten droplets and the width of the gate be coordinated such that the deposited solidified droplets pass out of the range allowed by the gate before an appreciable number of oncoming molten particles reaches the substrate. Overlap of impinging particles is reduced with narrowing gate width and, conversely, overlap increases with increasing gate width.

In any event, the length of flight of the molten droplets should be so adjusted that they impinge on the chill surface in the molten state. This may be accomplished by suitable choice and coordination of jet velocity, jet impingement angle and velocity of movement of the chill surface, and optionally, gate width if a gate is employed. The gate width depends on the angle of the impinging jet stream, on the position of the gate with respect to the point of impingement and on the jet velocity and the chill surface velocity, as well as on the surface tension and wetting properties of the liquid alloy with respect to the chill surface. Furthermore, the density of droplets in the stream, and their angular distribution, should be considered in selecting an appropriate gate. The size of the gate depends further on the desired level of exclusion of contamination of the glassy alloy powder by crystalline by-products. The powder is removed from the surface of the chill body by suitable means, such as rotating brushes or scraping means, or by blowing it off by means of a blast of air or of inert fluid, such as nitrogen. Desirably, removal is continuously effected in the area downstream of the area of impingement of the atomized droplets, but at a point ahead of the point of impingement of the atomized molten droplets. Preferably, a scraper is used to remove the solidified product adhering to the moving chill surface.

The chill cast glassy alloy powders made according to the process of the present invention have comparatively rough and sharp edges. These particles tend to interlock during compaction. They can be compacted in a solid body having higher green strength but less density than a compacted body prepared from powder produced according to the process disclosed in my co-pending commonly assigned U.S. application Ser. No. 023,413, filed 3/23/79, now U.S. Pat. No. 4,290,808.

Glassy metal powders made in accordance with the invention process can be used for powder metallurgical applications. They are also suitable for fabrication of magnetic cores. The typical characteristics of such magnetic cores for use as stable induction components at audio and low radio frequency ranges are permeabilities between 14 and 300 units, low core loss and stability of magnetic properties against large changes in frequency and temperature.

The metallic glass powders of suitable size ranges can be uniformly mixed in a suitable proportion with powders of crystalline metals and alloys such as aluminum and aluminum base alloys, copper and copper based alloys and stainless steel. These powder mixtures can be subsequently powder metallurgically processed i.e. is pressed and sintered into dense parts.

A metallic glass is an alloy product of fusion which has been cooled to rigid condition without crystallization. Metallic glasses are characterized by having a diffuse X-ray pattern. Such metallic glasses in general have at least some of the following properties: high hardness and resistance to scratching, great smoothness of a glassy surface, dimensional and shape stability, mechanical stiffness, strength and ductility and a relatively high electrical resistance compared with related metals and alloys. Powder comprises fine powder with particle size under 100 microns, coarse powder with particle size between 100 microns and 1000 microns and flake with particle size between 1000 microns and 5000 microns.

The terms metallic glass, or glassy metal and amorphous metal are used herein interchangeably.

Alloys suitable for use in the process of the present invention are those which upon rapid quenching from the melt at rates in the order of at least about $10^{4°}$ to $10^{6°}$ C./sec form amorphous glassy solids. Such alloys are, for example, disclosed in U.S. Pat. No. 3,856,513, U.S. Pat. No. 3,981,722, U.S. Pat. No. 3,986,867, U.S. Pat. No. 3,989,517 as well as many others.

For Example, Chen and Polk in U.S. Pat. No. 3,856,513 disclose alloys of the composition $M_aY_bZ_c$, where M is one of the metals, iron, nickel, cobalt, chromium and vanadium, Y is one of the metalloids, phosphorus, boron and carbon and Z equals aluminum, silicon, tin, germanium, indium, antimony or beryllium with "a" equaling 60 to 90 atom percent, "b" equaling 10 to 30 atom percent and "c" equaling 0.1 to 15 atom percent with the proviso that the sum of a, b and c equals 100 atom percent. Preferred alloys in this range comprises those where "a" lies in the range of 75 to 80 atom percent, "b" in the range of 9 to 22 atom percent, "c" in the range of 1 to 3 atom percent again with the proviso that the sum of a, b and c equals 100 atom percent. Furthermore, they disclose alloys with the formula $T_iX_j$ wherein T is a transition metal and X is one of the elements of the groups consisting of phosphorus, boron, carbon, aluminum silicon, tin, germanium, indium, beryllium and antimony and wherein i ranges between 70 and 87 atom percent and j ranges between 13 and 30 atom percent. However, it is pointed out that not every alloy in this range would form a glassy metal alloy.

Referring now to FIG. 1 there is shown a chamber 18 containing a crucible 20 containing melt 22. The melt 22 comprises a metallic alloy which is heated by an induction heating system of which the induction heating coils 24 are shown. The upper end 26 of the crucible is tightly mounted to a pair of flanges 28 and 30 of a chamber 18. The crucible 20 is connected at its upper end 34 to a pressure chamber 36 which may be pressurized with suitable gas coming through line 38 from a valve 40 and from another line 42 which is connected to a gas supply, e.g. a supply of argon gas. In parallel to the gas supply line, there is a second valve 44 which is connected to a line 46 which is in turn connected to a vacuum pump providing the possibility of evacuating the area above the melt initially before the furnace is set in operation and before the argon or inert gas pressure is applied.

The power for the induction heater coils 24 is supplied by supply lines 46 and 48 which are led out of the chamber 18 through seal 50. Power supplies suitable for supplying induction power of 10 kilowatt or more are commercially available.

The liquid metal alloy is ejected from crucible 20 through nozzle 52 as a narrow jet 54. A nozzle assembly 56 for generating a high pressure gas stream is provided, which stream impinges upon the molten metal jet at 58 and changes the direction of the molten metal jet to atomize it. The atomized particles are directed towards an optional shutter 60 which has an orifice 62 suitable for selectively passing a narrow stream of the atomized molten metal particles 64 to restrict the momentary area of impingement on the traveling wheel 66. The shutter assembly is held by rods 67 and 68 to flanges 28 and 30 closing the chamber 18. After passing the shutter orifice 62, the particles impinge upon a rotating disc 66. The surface speed of disc 66 in the vicinity of impingement of the atomized molten metal is approximately 20 m/sec. As the liquid droplets come in contact with the chill surface provided by disc 66, they are rapidly chilled to the glassy solid state. Means for cooling disc 66 [not shown] may optionally be provided. Disc 66 is made of high purity copper for good thermal conductivity. The glassy solid particles are then scraped off disc 66 by means of spring loaded scraper 71. The scraped off glassy metal powder is collected in a collection area 70. A flange 72 provides access to the collected glassy metal powder. Rotating disc 66 is mounted on a shaft 69 which enters chamber 18 through seal 76. Rotating power is provided by a variable speed electrical motor 78. The motor 78 is coupled to shaft 69 by means of flexible coupling 80. A mounting stand 82 is provided for the electrical motor to adapt its position and to give additional stability. The operation can be observed through a viewing port 84 which encompasses a vacuum sealed window 86. For measuring the temperature of the melt in the crucible and, if desired, at the point of atomization an infrared pyrometer 88 is provided which is mounted in such position as to collect the radiation emitted from the crucible and the melt through the viewing port 84.

Chamber 18 is further provided with a pumping port 90 connected to a vacuum system (not shown). The whole assembly is preferred mounted on the stand 92 which insures rigidity of the system.

Figure 2:
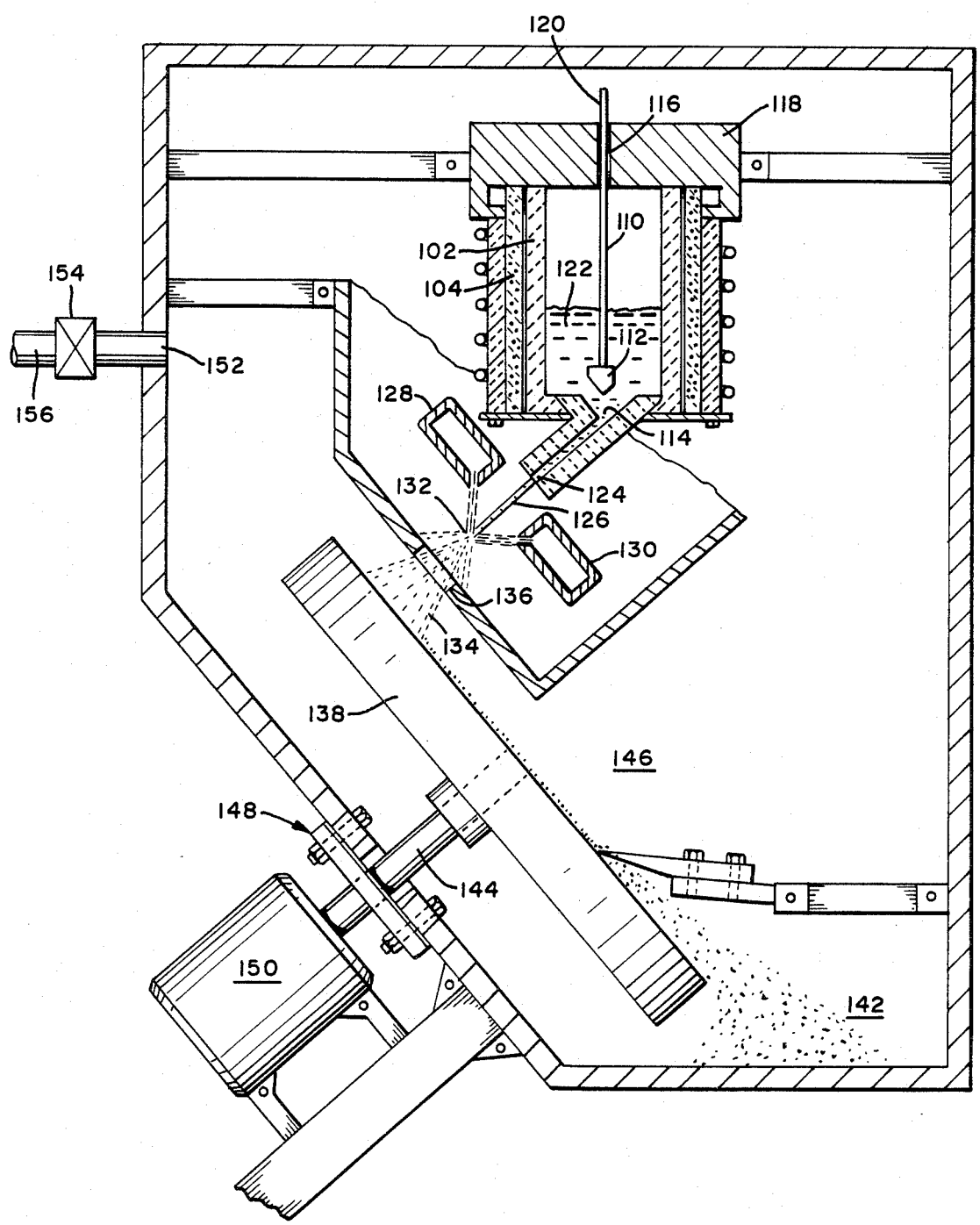
FIG. 2 is a sectional elevation view of a second embodiment of an apparatus for producing glassy metallic powders.

FIG. 2 shows a different embodiment of the apparatus of the present invention. The apparatus is enclosed within chamber 146. A crucible 102 is located inside susceptor 104, which can be made of any material which has stability at high temperatures with good electrical conductivity such as tungsten, molybdenum and graphite. An induction heating system indicated through coils 106 provides the power for melting the alloy. Between the heating coils and the susceptor is provided an insulating layer 107 for preventing heat losses from the susceptor.

The insulating layer 107 can be made from a number of suitable materials, for example of fibers of high melting refractories such as zirconia. The material of the crucible 102 is a material which does not react with the melt and has sufficient stability at the melt temperature.

A stopper rod 110 reaches into the melt 122 and has at its end a stopper 112 for closing the opening 114 in the bottom of crucible 102. Stopper rod 110 can be made from boron nitride or other suitable material which would not react with the melt at the high temperatures. Stopper rod 110 is introduced into crucible 102 through an opening 116 in cover 118. Upper end 120 of stopper rod 110 can be raised and lowered to open and close opening 114 at the bottom of crucible 102. A connecting line 121 provides for a possibly pressurized atmosphere over the melt 122 by making a connection to a gas reservoir (not shown). The metal 122 fills part of the crucible. At the bottom of crucible 102 there is provided nozzle 124 for ejecting a jet 126 of liquid metal. Two atomizers 128 and 130 are provided which eject pressurized gas impinging upon the jet 126 of liquid metal at 132 to disperse the jet into a stream 134 of droplets of molten metal. The droplets are restricted with respect to their path by a shutter 136 having an opening. Those droplets which pass through the shutter opening then impinge upon a rotating disc 138 made from copper. Upon impact on rotating disc 138 the liquid droplets are rapidly quenched to form particles of solid metallic glass. The solidified particles move with the rotating copper disc 138 and are scraped off by a spring loaded scraper 139. They fall into a collection area 142 from where they can be removed periodically. The copper disc 138 is mounted on a shaft 144 which enters the chamber 146 through a seal 148 and which is driven by a motor 150. The chamber 146 may be evacuated through a pipe 152 connected to a valve 154 and pipe 156 leading to a vacuum pump (not shown).

Figure 3:
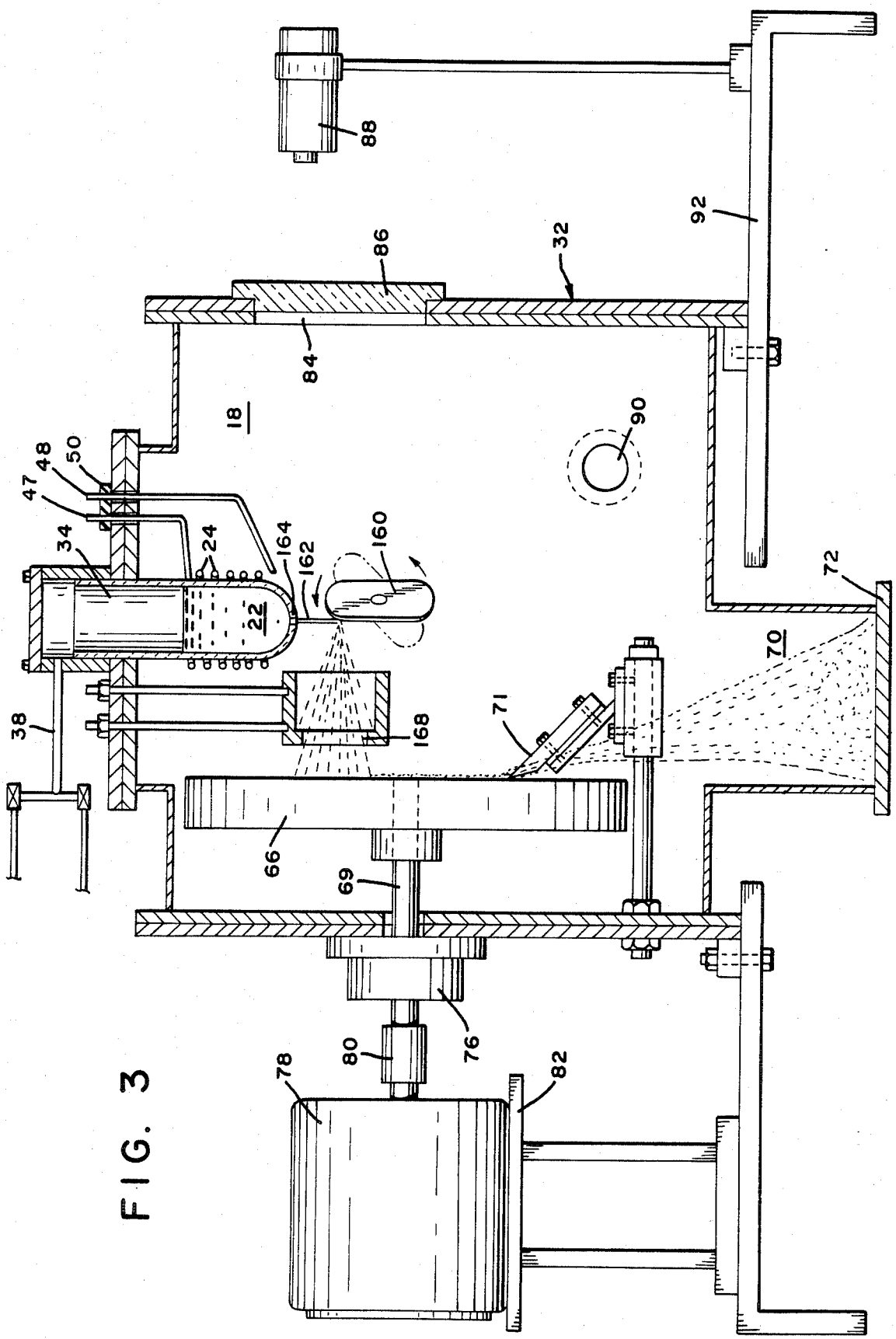
FIG. 3 is a sectional elevation view of an apparatus for producing glassy metallic powders by an atomization and chill process involving a rotating ceramic spinner.

FIG. 3 shows an atomization and quenching system which is in many ways similar to the system shown in FIG. 1. However, in contradistinction to FIG. 1, this system employs a rotating spinner 160 for atomizing the molten metal jet 162 projected out of the nozzle 164. Upon impingement onto the rotating spinner, the molten metal jet is atomized and propelled toward shutter 168. The rotating spinner 162 comprises an oblong disc which is preferably made from a refractory material which is not wetted by the glass forming melts. Use of a rotating spinner permits atomization of the jet of molten metal under vacuum.

Figure 4:
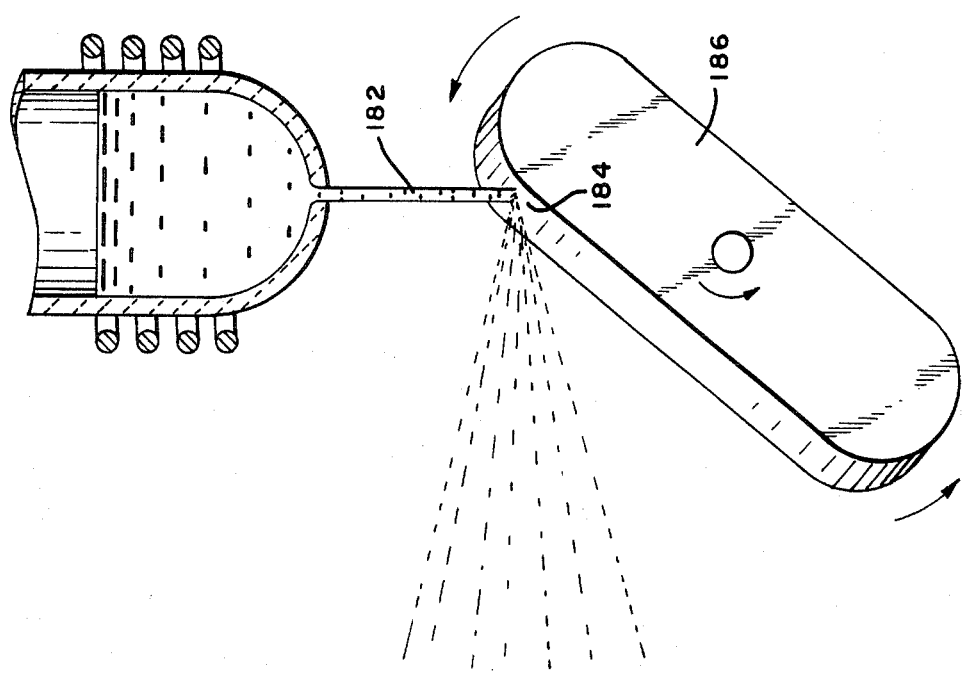
FIG. 4 is a sectional elevation view of a rotating spinner for atomization of a liquid metal jet.

FIG. 4 shows an enlarged view of the spinner employed in the embodiment of FIG. 3. The spinner comprises a bar with rounded ends. The speed of the points of impingement on the spinner are at least about four times the velocity of the jet. When the jet of molten metal 182 impinges on the surface 184 of the spinner 186, the molten jet is atomized and the atomized particles are propelled in the direction of rotation of the spinner toward the chill surface [not shown].

Different spinners of suitable configurations can be used in atomizing and redirecting the molten spray.

Figure 5:
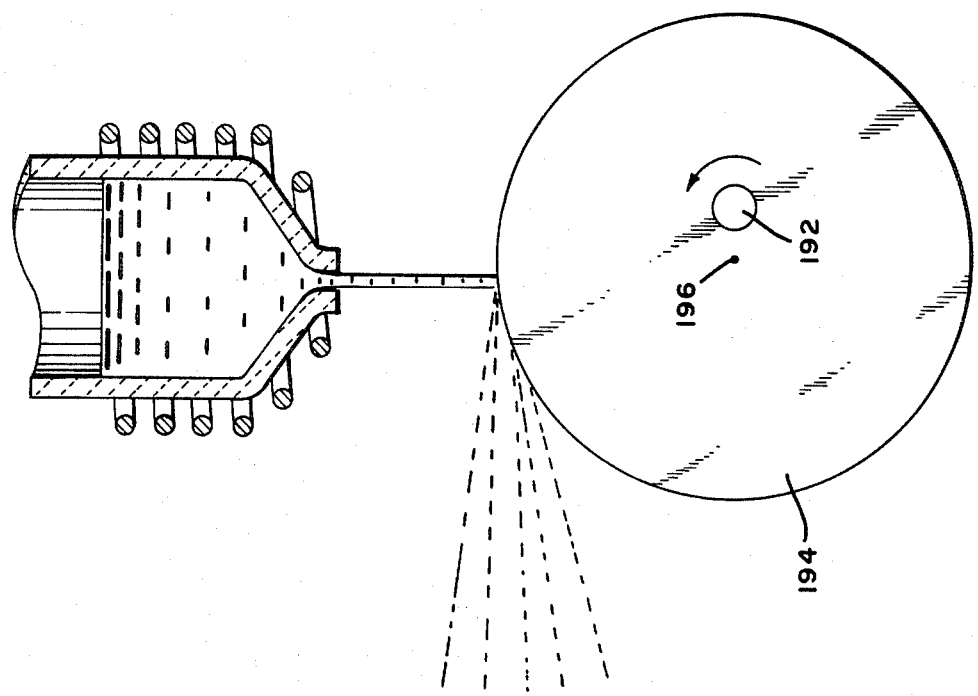
FIG. 5 is a sectional elevation view of an off axis rotating circular disc for atomization of a liquid metal jet.

FIG. 5 illustrates another means for atomizing a jet of molten metal. It shows an eccentrically mounted circular disc which rotates at a rapid speed. Optionally, the disc may be dynamically balanced. The extremely rapid rotation of the circular disc around an off-centered axis induces indulatory motion of the solid surface in contact with the jet resulting in instability of the molten jet. The molten jet is thereby atomized into small droplets of molten metal. The axis of rotation 192 of disc 194 is located about ½ to ⅛ of an inch distant from its center 196. The surface speed of the rotating disc in the area of inpingement is equal to or greater than 60 meters per second.

Figure 6:
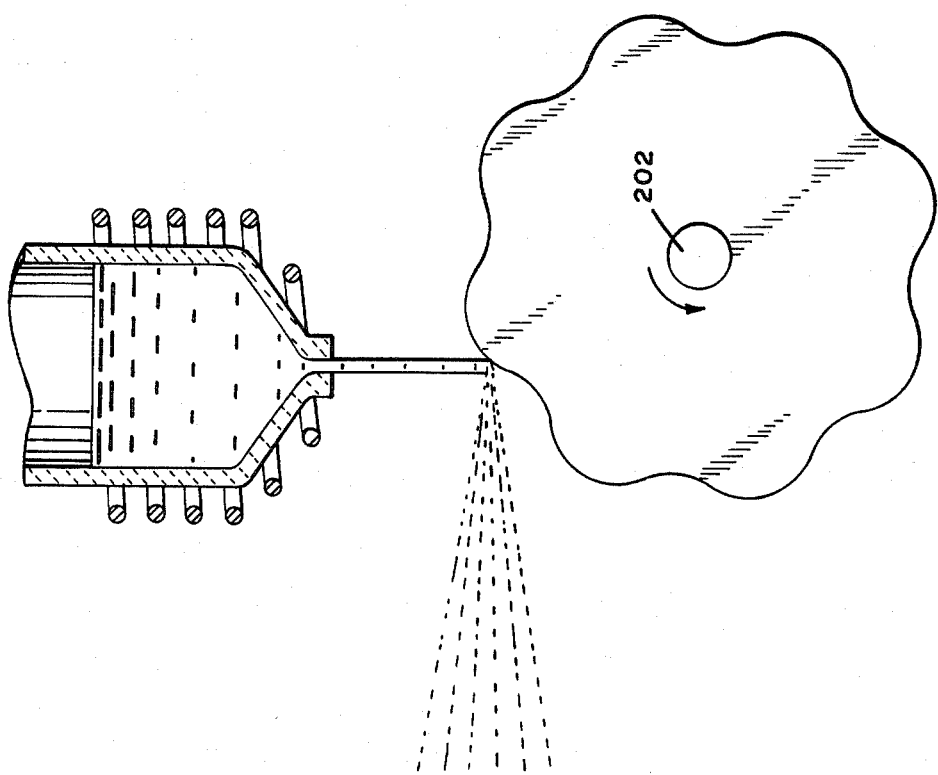
FIG. 6 is a sectional elevation view of an apparatus for atomization of a liquid metal jet employing a cam.

FIG. 6 shows a lobed cam shaped disc for atomization of a jet of molten metal. It rotates around axis 202 which may be, but need not be offset from the center of the disc. The disc is rotated to provide a circumferential surface velocity from about 1000 to about 10,000 m/sec. preferably and the jet of molten metal to be impinged upon it preferably has a velocity in the range of 5 to 10 meters per second. Desirably, the jet of molten metal is directed against the disc such that the stream of molten droplets created upon impact with the spinner lies mostly outside of the enveloping circle of the crest of the lobes.

Figure 7:
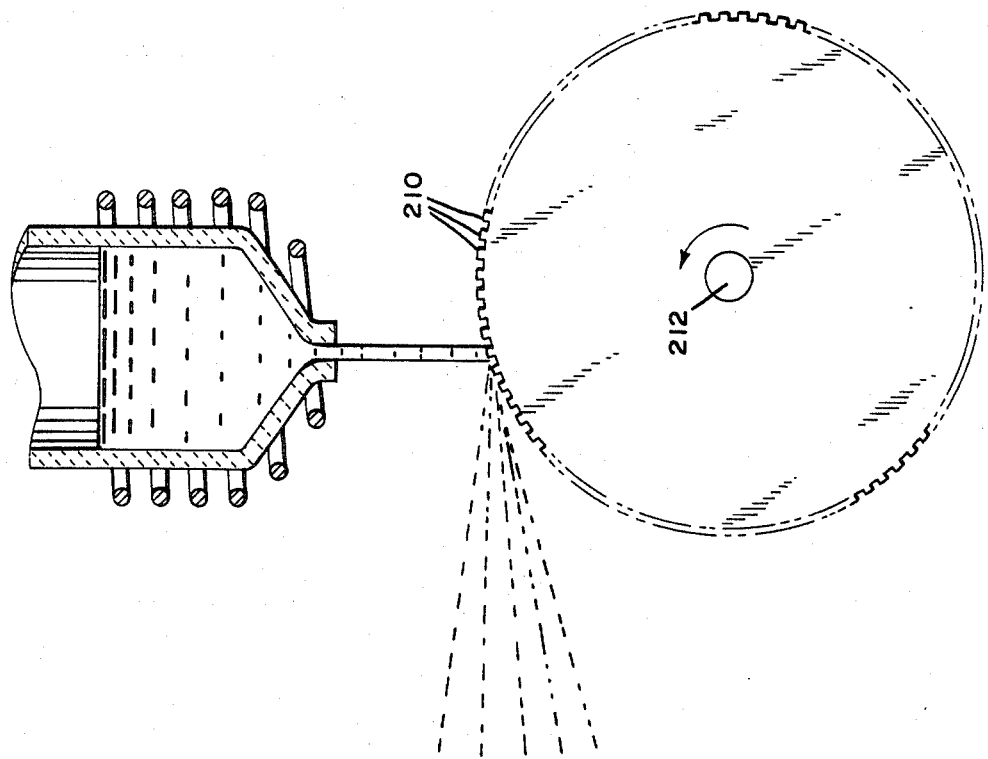
FIG. 7 is a sectional view of an apparatus for atomization of a liquid metal jet employing a circular saw type spinner.

FIG. 7 shows an additional type of spinner having saw teeth 210. The purpose of the saw teeth 210 is to create instabilities in the molten alloy jet for producing a finely atomized stream of molten droplets. The spinner which is desirably made of ceramic material rotates around an axis 212, which may or may not coincide with its center. The surface speed of such spinner can lie in the range of about 3 to 500 m/sec and preferably in the range of about 30 to 50 m/sec.

Figure 8:
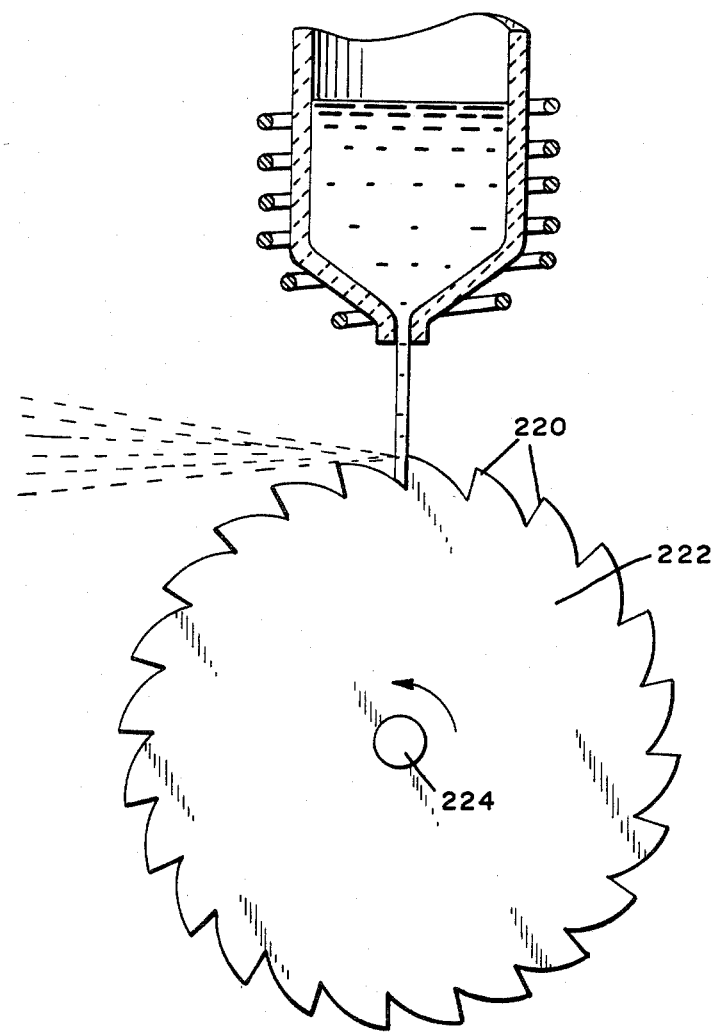
FIG. 8 is a sectional elevation view of an apparatus for atomization of a liquid metal jet employing a circular rip saw type spinner.

FIG. 8 shows a different type yet of rotating spinner 222 with larger saw teeth 220. The saw teeth of this embodiment are desirably made from a ceramic material which is not wetted by the melt. The surface speed of the rotating spinner lies in the range of about 3 to 500 m/sec and preferably is in the range of about 30 to 50 meters per second.

Figure 9:
FIG. 9 is a photomicrograph of a sectional plane view illustrating the shape of chill substrate cast glassy metallic powder of composition $Fe_{40}Ni_{40}P_{14}B_6$ (atom percent) alloy.

FIG. 9 shows a photomicrograph of representative metallic glass powder which can be obtained according to the present invention. The particles have shapes of elliptical thin platelets, with rough edges. Such particles interlock together very well during cold compaction, leading to preforms of superior green strength at a given pressure. The particles have a diameter in the order of about 20 microns.

The examples set forth below further illustrate the present invention and set forth the best mode presently contemplated for its practice.

EXAMPLE 1

This example illustrates preparation of metallic glass powder and flakes by chill substrate casting of atomized molten metal alloy droplets. The apparatus employed was generally as indicated in FIG. 1. A glass forming alloy $Ni_{45}Co_{20}Cr_{10}Fe_5Mo_4B_{16}$ (atomic percent) was melted in a quartz crucible by means of an induction heater. The molten alloy was expelled vertically through an orifice in the crucible as a molten jet of 0.05 inches diameter. The molten jet was impinged by a horizontal jet of atomizing fluid (nitrogen) under high pressure ranging from about 400 to 600 psi and thereby atomized into small droplets and propelled towards a rotating copper disc. The distance between the orifice and point of impact for atomization was 0.5 cm. The distance between the point of impact and the chill surface provided by the rotating copper disc was 12 cm. The surface velocity of the chill surface was 200 cm/sec. The shutter was located 3 cm away from the point of atomization and had an opening width of 1 cm and length of 2 cm. The resulting molten droplets in the form of a spray were allowed to pass through the shutter opening and impacted against the flat surface of the rotating copper disc. The chill cast particles were scraped off the surface as they were being deposited. The surface velocity of the copper disc in the approximate area of droplet deposition varied between about 2000 to 2500 feet per second. The shutter opening, the surface speed of the copper disc, the velocity of the jet of molten metal and the pressure of the atomizing fluid were adjusted to minimize overlap of the droplets upon contact with the surface of the copper disc. Quenched metallic glass particles of irregular shape as shown in FIG. 9 were thus obtained. Their particle size ranged from about 25 microns to 400 microns. A small portion of the particles with particle size under 25 microns was found to be fully crystalline. Apparently, the smaller molten droplets tended to solidify before hitting the chill surface and hence were not quenched into the glassy state. The larger size particles were found to be fully amorphous as determined by X-ray analysis. By increasing the melt temperature and hence the temperature of the molten droplets, and by decreasing the flight path i.e. the distance between the point of atomization and the point of impingement on the substrate, a significantly higher yield of metallic glass particles with size smaller than 25 microns could be obtained in a typical run.

EXAMPLE 2

A process of chill substrate casting of molten metal droplets is presented in this example. Apparatus employed was generally as illustrated in FIG. 1. A verticle jet of molten metal having the composition $Fe_{40}Ni_{40}B_{20}$ (atomic percent) was impinged upon and atomized into small droplets by a horizontal high pressure (about 400 to 600 psi) argon gas jet and the resultant molten droplets in the form of a spray were impact quenched against the flat surface of a rotating copper disc. The chill cast particles were scraped off this surface as they were being deposited. The particles were irregular in shape due to the splatting onto the substrate. The particle size ranged mostly between 25 micron to 400 micron, an the particles in this size range were found fully glassy. A small portion of about 5 weight percent of particles with size smaller than 25 micron was obtained in a typical run and the alloy powders of particle size less than 25 micron were found to be mostly crystalline. The smaller molten droplets apparently solidified at a relatively slow rate before hitting the quench substrate and hence remained crystalline. By decreasing the length of the flight path of the droplets, a higher yield of metallic glass particles with a size smaller than 25 micron can be achieved.

EXAMPLE 3

An alloy having the composition $Co_{45}Fe_{17}Ni_{13}Cr_5Mo_3B_{17}$ (atomic percent) was squirted through an orifice of a quartz crucible to produce a jet of molten metal of 0.08 inches diameter. This jet was impinged onto a flat and eliptically shaped quartz spinner similar to the oblong spinner shown in FIG. 4 and rotating at high velocity was situated in the path of the jet of molten metal. The quartz spinner rotating at high velocity atomized the molten jet into small droplets. The surface speed of the spinner at the point of atomization was maintained between 30 and 50 m/sec. These droplets passed through a shutter of adjustable opening size and were impact quenched against a rotating chill substrate. The particles deposited on the rotating chill substrate were scraped off by a scraper. The resulting quenched particles having irregular shape and size in the range between 25 microns to 400 microns were found to be fully amorphous.

EXAMPLE 4

Magnetic composite cores from glassy metal powder

Amorphous metallic flakes with sizes ranging between about 150 and 1000 micron of an alloy having the composition of $Fe_{40}Ni_{40}P_{14}B_6$ (atomic percent) were prepared by quenching an atomized stream of molten particles on a chill surface. The resulting flakes were subsequently embrittled by anealing below the glass transition temperature for a time 1 hour and a temperature of 200° C. and then the flakes were subjected to dry ball milling under an atmosphere of high purity argon atmosphere for 16 hours. There was thus obtained a powder of fine amorphous particles of irregular shape with an average size of about 25 microns. This powder was uniformly blended with 2 percent submicron size magnesium oxide particles, and the mixture was pressed into ring shaped cores of an outer diameter of 1 inch and an inner diameter of 2 mm by compaction under high pressures of between 200,000 and 250,000 pounds per square inch. The magnesium oxide was added to provide uniformly distributed air gaps in the core to increase its resistivity. The compressed cores were annealed at 300° C. for 2 to 16 hours. Typically a core pressed at 250,000 pounds per square inch and annealed at 300° C. for 16 hours was found to possess a permeability of 125 units.

EXAMPLE 5

An amorphous metallic powder with an average particle size below about 75 micron of an alloy with the composition $Mo_{40}Fe_{40}B_{20}$ (atomic percent) was uniformly mixed in various proportions with aluminum powder also having average particle size below about 75 microns. The resulting mixtures were hot pressed under vacuum into cylindrical compacts, applying 4000 pounds per square inch pressure at 500° C. for ½ hour. Since the amorphous metallic powder particles have crystallization temperatures higher than 800° C., they therefore did not crystallize during the hot pressing operation. The incorporation of amorphous metal alloy particles into the aluminum matrix increased substantially the hardness of the resulting powder metallurgical compact. Typically, an aluminum compact obtained as described above containing only about 10 weight percent of amorphous metallic particles will have a hardness of about 150 kilograms per square millimeter, which is much higher than the hardness of about 20 kilograms per square millimeter typically found in annealed pure aluminum.

EXAMPLE 6

This example illustrates use of fine metallic glass powders for making high permeability magnetic cores. Metallic glass powders of composition $Fe_{40}Ni_{40}P_{14}B_6$ (atomic percent) are suitable for fabricating high permeability magnetic cores. The typical characteristics of such magnetic cores for use as stable induction components at audio and low radio frequency ranges are permeabilities between 14 and 300 units, low core loss and stability of magnetic properties against large changes in frequency and temperature.

Amorphous metallic powder of an $Fe_{40}Ni_{40}P_{14}B_6$ alloy with particle size less than 30 microns were blended with submicron ceramic particles and pressed into ring-shaped cores using high pressures between 200,000 and 250,000 psi at room temperature. The ratios by weight of metallic glass to ceramic powder were in the range of between about 0.01 and 0.02. The ceramic powder was magnesium oxide. Other suitable ceramic powders include aluminum oxide and yttrium oxide. The purpose of addition of the fine ceramic particles is to provide uniformly distributed air gaps in the core to increase its electrical resistivity. The pressed amorphous metallic cores were subsequently annealed at temperatures below glass transition temperatures at temperatures between about 150° C. and 300° C. to have improved soft magnetic properties.

I claim:

1. A method for making metallic glass powder, comprising the steps of:
   (a) generating a jet of molten glass forming alloy;
   (b) atomizing said jet into a stream of discrete molten metal droplets;
   (c) directing the stream of atomized molten metal droplets against a moving chill surface to effect impingement and rapid solidification of the droplets thereon; and
   (d) controlling the surface velocity of said chill surface, the velocity of said molten metal droplets and the shape of said stream to minimize overlap of the droplets during said impingement.

2. The method for making metallic glass powder according to claim 1 wherein said atomizing step further comprises the step of intersecting said jet with a stream of inert fluid.

3. The method for making metallic glass powder according to claim 2 wherein the stream of inert fluid is provided in the form of a flat sheet by forcing the fluid through a correspondingly shaped orifice under a pressure greater than 100 psi and wherein the stream of inert fluid is directed against the jet of molten metal alloy at an angle greater than 10° between the velocity vectors of fluid stream and jet.

4. The method for making metallic glass powder according to claim 2 wherein the inert fluid is an inert gas.

5. The method for making metallic glass powder according to claim 2 wherein the inert fluid is an inert liquid.

6. The method for making metallic glass powder according to claim 1 wherein the jet is atomized by contacting it with a moving solid surface.

7. The method for making metallic glass powder according to claim 6 wherein the solid surface is a rapidly moving body having a surface which is not wetted by the molten metal.

8. The method for making metallic glass powder according to claim 1 wherein the rapidly moving body is a rotating body.

9. The method for making metallic glass powder according to claim 8 wherein the rotating body is made of quartz.

10. The method for making metallic glass powders according to claim 8 wherein the rotating body is a disc provided with circumferentially spaced teeth.

11. The method for making metallic glass powder according to claim 1 wherein solidification of the metal is effected under cooling in contact with the chill surface at the rate of at least about $10^{4°}$ C./sec.

12. The method for making metallic glass powder according to claim 1 wherein the particle size of the metallic glass powder is less than 100 micron.

* * * * *